March 27, 1956 L. HAGERMAN 2,739,531
DECORATING MACHINE
Filed Aug. 29, 1951 6 Sheets-Sheet 1

FIG. 1.

LAWRENCE HAGERMAN,
INVENTOR.

BY

AGENT

March 27, 1956　　　　L. HAGERMAN　　　　2,739,531
DECORATING MACHINE
Filed Aug. 29, 1951　　　　　　　　　6 Sheets-Sheet 3

LAWRENCE HAGERMAN,
INVENTOR.

BY

AGENT

March 27, 1956

L. HAGERMAN 2,739,531

DECORATING MACHINE

Filed Aug. 29, 1951

LAWRENCE HAGERMAN,
INVENTOR.

BY

AGENT

March 27, 1956 L. HAGERMAN 2,739,531
DECORATING MACHINE
Filed Aug. 29, 1951 6 Sheets-Sheet 5

LAWRENCE HAGERMAN,
INVENTOR.

BY
AGENT

United States Patent Office 2,739,531
Patented Mar. 27, 1956

2,739,531

DECORATING MACHINE

Lawrence Hagerman, Rivera, Calif.

Application August 29, 1951, Serial No. 244,235

15 Claims. (Cl. 101—126)

This invention relates to machines for stencilling decorative markings, lettering and like insignia upon the surfaces of cylindrical articles such as bottles and jars, and more particularly relates to apparatus for carrying such articles into and out of a printing station, registering the articles with respect to the station, and rotating the registered articles during the decorating process.

It is an object of my invention to provide a decorating machine in which a continuous cycle of receiving, registering printing and discharging an article is effected at high speed, it being recognized that although modern machinery for the purpose has been much improved in efficiency, the decorating process still constitutes a serious bottleneck in modern industry, being relatively slow compared to many other steps in which bottles, jars and the like are automatically handled.

Recognizing further that multicolor decorating, in which it is necessary to register the decorated article with great accuracy to receive successive decorations is particularly relatively slow, it is an object of my invention to provide a positively acting registration device for a cyclically operating decorating machine, which device functions to register one bottle or like article while a preceding article is being printed, so as to save a considerable portion of the cyclic time interval, and which requires no secondary registration of the article when the article is brought to the printing station.

In this connection, it is a more detailed object of my invention to provide a novel clutch and brake mechanism and actuating mechanism therefor which operate in a highly efficient and positive manner with a minimum of lost motion and time.

In further recognition that the transfer of articles into and out of cyclically but intermittently operating registration and printing mechanism not infrequently requires an undue proportion of the cyclic period, it is an object of my invention to provide transfer mechanism which may be coordinated with extremely brief periods of movement of the intermittently moving mechanism, in order that the cyclic period need not be extended materially beyond the sum of the time intervals when the intermittently moving mechanism is necessarily stationary.

It is contemplated that my invention may be applied to existing decorating machines, which may be of the common squeegee stencilling type or of other suitable types, as the article-handling portion thereof, and a general object of my invention may therefore be said to be provision of article-handling apparatus for such machines in which the sum of the time intervals required for transferring, registering, and moving a given article is no more than co-extensive with the minimum time interval required by the squeegee or other decorating apparatus for printing on a preceding or succeeding article.

A difficulty attending existing squeegee machines has been that of applying decorations to conical surfaces such as the shoulder between the body and the neck of a bottle, and it is a further object of my invention to coordinate my improved article-handling mechanism with the printing apparatus to facilitate conical decoration.

Still another object of my invention is to provide transfer and registration apparatus capable of handling articles of a wide range of sizes and shapes so as to increase the utility of decorating machines to which my apparatus is applied.

In broad terms and assuming for convenience that the articles to be decorated are bottles, I accomplish the foregoing objects and other advantages which will become apparent as this specification proceeds, by coordination of a rotary loading assembly rotating about a vertical axis with a turret assembly rotating about a horizontal axis, the turret assembly having a plurality of chucks for receiving bottles from the loading assembly and carrying them with intermittent motion to registration and printing stations and then returning them to the loading assembly. The loading assembly has two sets of arms, in alternating succession, one for carrying bottles to the turret assembly and the other for carrying bottles away from the turret assembly. The arms rotate continuously, the one set delivering bottles to the turret assembly just after the latter starts to rotate, and the second set receiving the bottle from the turret assembly just as the latter comes to a stop. By this construction and timing the usual prolongation of transfer periods in intermittent motion machines is avoided, and although bottles go into and out of the turret assembly at the same station they do so at times selected with reference to the convenience of the printing apparatus, not dictated by the convenience of the transfer apparatus.

The bottles are chucked in the turret assembly so that they may be rotated about their own axes, to receive correct registration and to receive the decoration. Intermittent rotation of the turret moves the bottles successively to a registration station where they are clutched to a register unit for rotation to registered position, and then to the printing station where they are clutched to a printing spindle for rotation for printing. The register unit comprises a friction drive which rotates the bottle until a small nub or other indexing point on the bottle encounters a mechanical stop. In addition to rotating, the turret is also mounted for movement longitudinally of its axis, the actual movement being only a small fraction of an inch and being cam-actuated. A retractive movement, away from the printing apparatus occurs just as the turret concludes each intermittent movement. This endwise movement of the turret serves to accomplish among other things, the following: it clutches the chuck at the registering station to the friction drive of the register unit; it clutches the chuck at the printing station to the printing spindle; and it releases brake assembly mounted on each individual station of the turret, to permit the respective chucks to rotate. An instant later, when registering of one bottle and printing of another have been accomplished, the turret is allowed to return forwardly, re-applying the brakes and thereby preventing accidental rotation of the newly registered bottle, and releasing the friction drive and the printing spindle just before the turret resumes rotary movement. The very slight movement required to effect the engagement and release of the driving and braking mechanism considerably shortens the time required to start and stop the turret while maintaining accurate register of the transported bottles.

Printing mechanism for printing on conical surfaces may be coordinated with the reciprocating turret by means causing the printing mechanism to tilt and to swing into and out of contact with a conical surface as the latter is moved reciprocatingly by the turret.

In the accompanying drawings, illustrative of a presently preferred embodiment of my invention.

Figure 1:
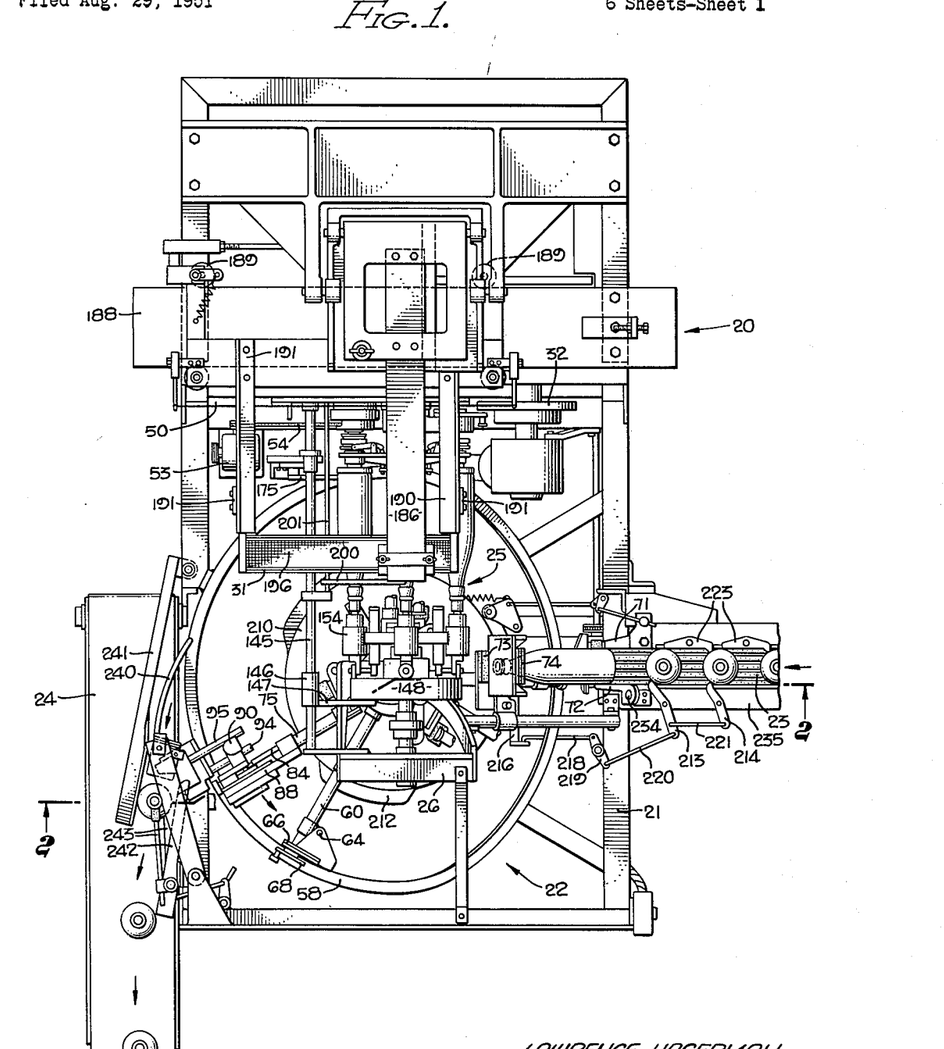
Fig. 1 is a plan view of my improved decorating machine, showing it combined with conventional squeegee printing apparatus.

Having reference to the details of the drawings, and as more particularly shown in Fig. 1, to a reciprocating squeegee printer, indicated generally at 20, there is attached a frame 21 which supports a rotary loading assembly 22 so that the latter may receive bottles or like articles from a loading conveyor 23 and eventually, after the bottles have been marked, deliver them to an unloading conveyor 24. Situated above the loading assembly 22 and below the squeegee mechanism of the printer 20 is a turret assembly 25, arranged to rotate upon a horizontal axis. The turret assembly 25 receives bottles from the loading assembly 22, conveys them by intermittent motion through registering and printing stations lying in a vertical circle, and returns them to the loading assembly 22. One end of the turret assembly is supported by the frame 21 adjacent to the printer 20, and the other end by frame members 26 near the axis of the loading assembly 22. It may be noted from Fig. 2 that the shaft 27 which provides the axis of rotation for the turret assembly 25 does not pass directly above the shaft 28 which provides the axis of rotation for the loading assembly 22, but is slightly off center with respect to the shaft 28, on the side thereof toward the loading conveyor 23.

Figure 2:
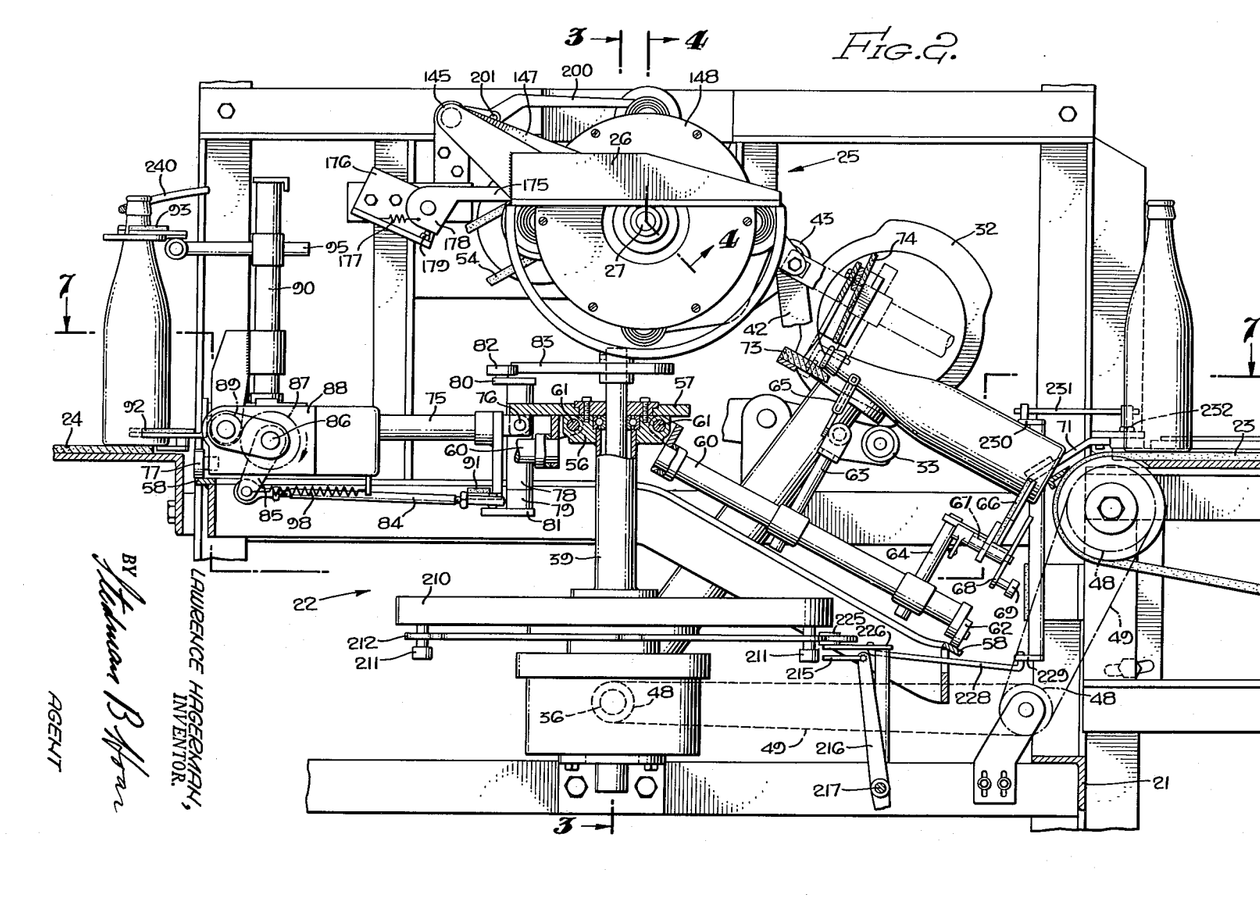
Fig. 2 is a vertical transverse sectional view, on a slightly enlarged scale, taken on the line of section 2—2 of Fig. 1, and showing the bottle receiving and discharging mechanism of the rotary loading assembly.
Figures 3, 11:
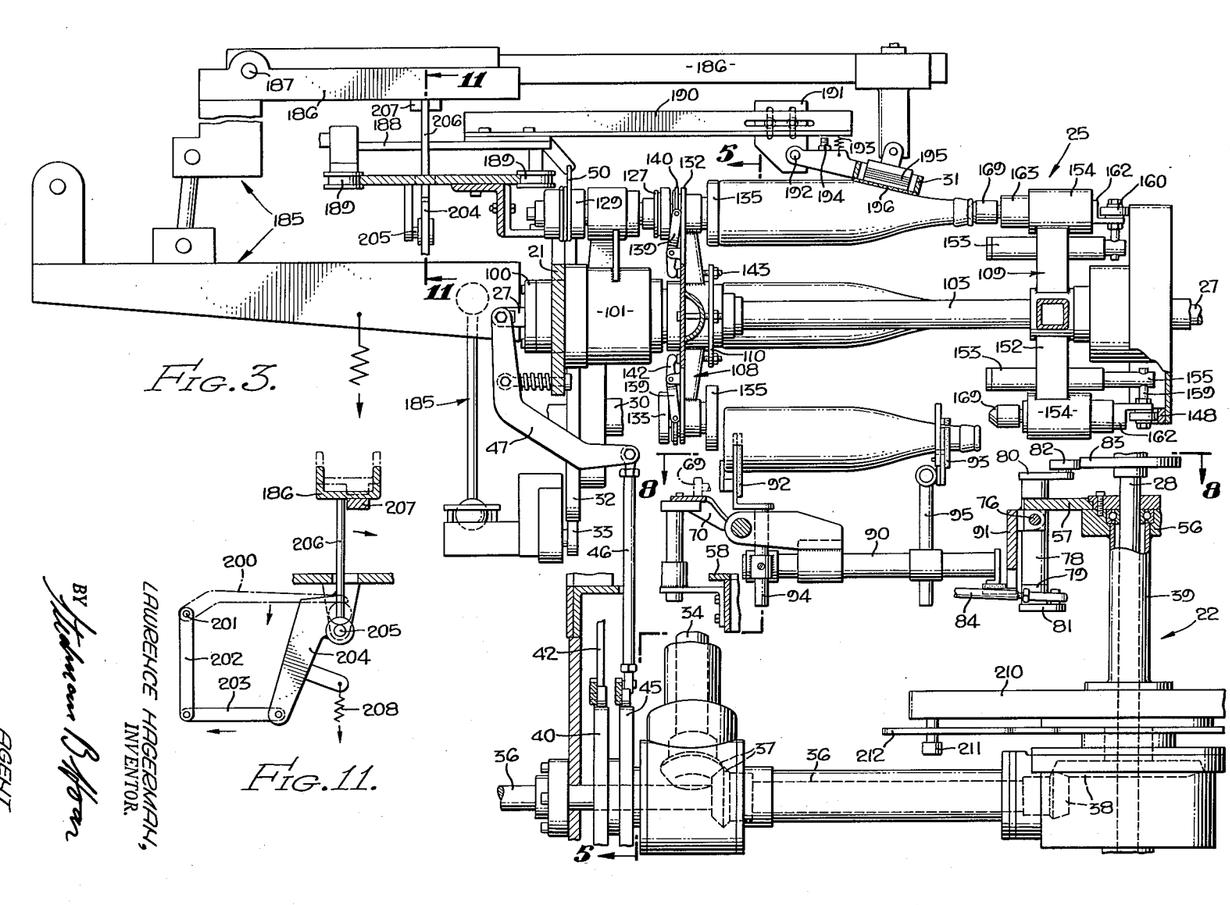
Fig. 3 is a vertical longitudinal sectional view on the line of section 3—3 of Fig. 2, showing that portion of the machine disposed towards the printing apparatus from the axis of the loading assembly, including the turret and the printing apparatus largely in elevation.
Fig. 11 is a vertical transverse sectional view on the line of section 11—11 of Fig. 3, illustrating a no-bottle no-print control system.
Figures 5, 10:
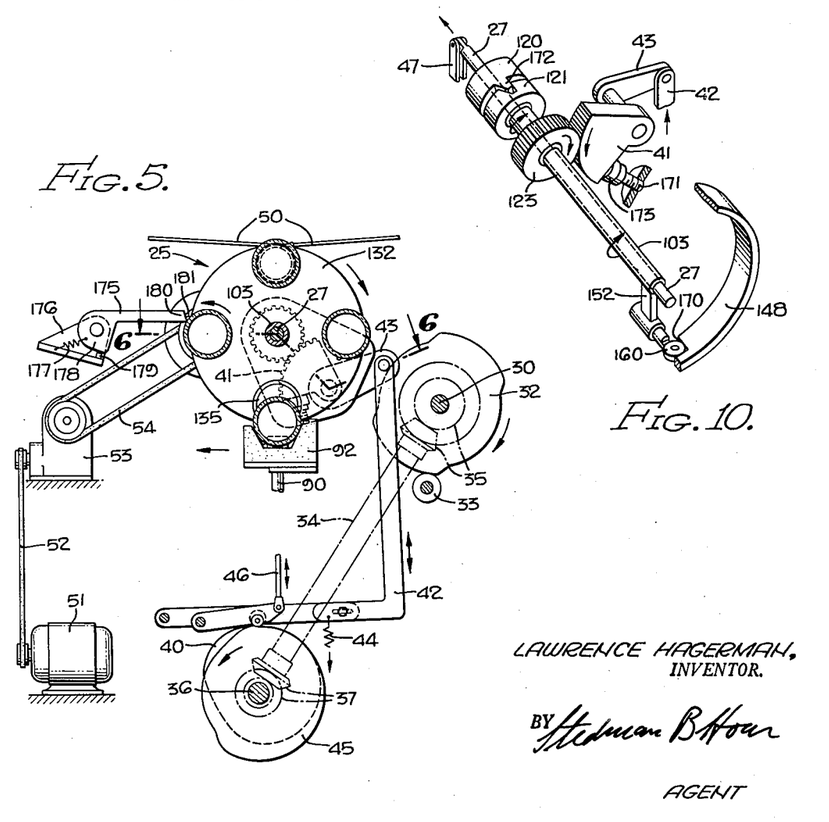
Fig. 5 is a vertical transverse sectional view on the line of section 5—5 of Fig. 3, and somewhat reduced in scale, showing the interconnection of parts of the driving mechanism.
Fig. 10 is a perspective view of the clutch lock by which back lash and free motion of the turret is eliminated.

The correlation of the principal elements will be best understood if the driving mechanism shown in Figs. 3 and 5 is first considered. Primary power may be derived from the drive shaft 30 of the printer 20 which customarily causes the squeegee and color frame 31 (see Figs. 1 and 3) to rise and descend and the latter to move back and forth through such mechanisms as the cam 32 and roller 33. A shaft 34 is driven from the shaft 30 by bevel gears 35 and in turn drives a horizontal shaft 36 by bevel gears 37. The shaft 36 is connected by gears 38 to a hub 39 rotatable upon the axial shaft 28 of the loading assembly 22. The horizontal shaft 36 also carries a cam 40 which through a quadrant rack 41, linkage cranks 42 and 43 and clutch mechanism to be described hereinafter causes the turret assembly to oscillate through a 90 degree angle around the shaft 27, return oscillation being effected through a spring 44. A second cam 45 on the shaft 36 operates through linkage 46 and crank 47 to cause reciprocation of the shaft 27. Thus, in general terms, the loading assembly 22 is caused to rotate continuously and the turret assembly is caused to reciprocate sufficiently to actuate its clutch mechanism and to rotate with intermittent motion. The loading conveyor 23 is also preferably driven from the shaft 36, to synchronize with the loading assembly 22, sprockets 48 and chains 49 for this purpose being shown in Fig. 2.

At the hereinbefore mentioned printing station, power is preferably supplied for rotating a bottle during the printing operation, by a belt 50 which reciprocates with the back-and-forth movement of the color frame 31, to which it is attached. Power is preferably supplied to the registering station by a motor 51 operating through a belt 52, a reduction gear 53, and a belt 54 adjusted to permit slippage. Obviously the belt 54 could receive power from the main power source, but a separate motor 51 is preferable as it may be made responsive to electronic controls instead of the mechanical obstruction provided by a nub on a bottle.

Turning now to Figs. 2, 7, 8, and 9, which best illustrate the rotary loading assembly 22, the hub 39 carries a support plate 56 upon which are pivotally mounted a plurality of loading arms 60 and a second support plate 57 upon which are pivotally mounted a plurality of unloading arms 75. The arms 60 and 75, which swing horizontally with rotation of the vertical hub 39, are pivoted for vertical movement in which they are guided by a cam track 58. They are arranged in pairs, in which one of the unloading arms 75 follows one of the loading arms 60. The number of such pairs may be one less than the number of stations, or intermittent movements of the turret assembly 25; as illustrated the latter makes four 90 degree movements in a cycle and the number of pairs of arms 60, 75, is three.

Each of the loading arms 60 has a pivot connection 61 to the support plate 56 and has a roller 62 at its distal end which runs on the cam track 58. Posts 63 and 64 are adjustably mounted on the arm 60 to accommodate various lengths of bottles, and carry saddle supports 65 and 66, respectively adapted to receive and support the neck and the body of a bottle, as in a saddle. A spindle 67 in the end of the arm 60 carries a finger 68 counterweighted by a roller 69 and biased to a position in which the finger may engage the base of a bottle carried in the saddle supports 65 and 66 to determine a limiting position beyond which the bottle-base may not extend. The roller 69 engages a cam track 70 disposed beneath the loading station of the turret assembly 25 to move the finger from the base of a bottle to permit the bottle to be grasped by a chuck.

In the transfer of a bottle from the loading conveyor 23 to a loading arm 60, the bottle falls forward into a pick-up station which temporarily supports the bottle until it is swept therefrom by the loading arm. A pair of movable fingers 71 and 72 below the end of the loading conveyor 23 form a V which supports the base of the bottle. A pad 73, supported from the frame members 26, receives the neck of the bottle. A swinging pad 74, mounted above the pad 73 first yieldingly presses on the mouth of the bottle to prevent the bottle from falling too far forward, and then swings back above the neck of the bottle to prevent the bottle from bouncing from the pick-up station. It will be noted from Fig. 2 that the pick-up station is inclined so that the bottle has only a short fall, the loading arm 60 being also inclined at this point to be parallel to the pick-up station.

Each of the unloading arms 75 has a pivoted connection 76 to the support plate 57 and has a roller 77 at its distal end which swings the arm vertically by rolling contact with the cam track 58. Adjacent to the pivot 76 and integral with the arm 75 is a bushing 78 in which rotates a crank shaft 79 having cranks 80 and 81 at its upper and lower projections from the bushing. The upper crank 80 carries a roller 82 which rolls on the periphery of a cam 83 mounted on the stationary axial shaft 28. The lower crank 81 is connected by a connecting rod 84 to a crank 85 mounted on the projecting hub 86 of a gear 87 which is carried in a gear housing 88 on the distal end of the arm 75. A second gear 89, meshing with the gear 87, has mounted on its hub what may be termed a forearm 90, as it may be doubled back upon the upper arm 75 in the manner of a human arm, the gear 89 representing the elbow joint. A half-ring support 91 is provided on the shoulder connection 76 to receive the end of the forearm 90 when it is doubled back. Saddle supports 92 and 93 are carried on posts 94 and 95 mounted adjustably on the forearm 90 to receive and hold a bottle in the same manner as the saddle supports 65 and 66, as illustrated in Fig. 3 in which the upper arm 75 is cut away at the shoulder and elbow. When the crank shaft 79 is rotated by action of the cam 83 on the roller 82, the connecting rod 84 causes the gear train 87, 89 to rotate through 90 degrees, and the forearm 90 is raised from a horizontal position to a vertical position. Thus a bottle nested in the saddle supports 92 and 93 is placed in vertical position upon the unloading conveyor 24. When the roller 82 passes beyond the shoulder of the cam 83, a spring 98 which has been extended by rotation of the crank 85 returns the crank and returns the forearm 90 to horizontal.

Figure 9:
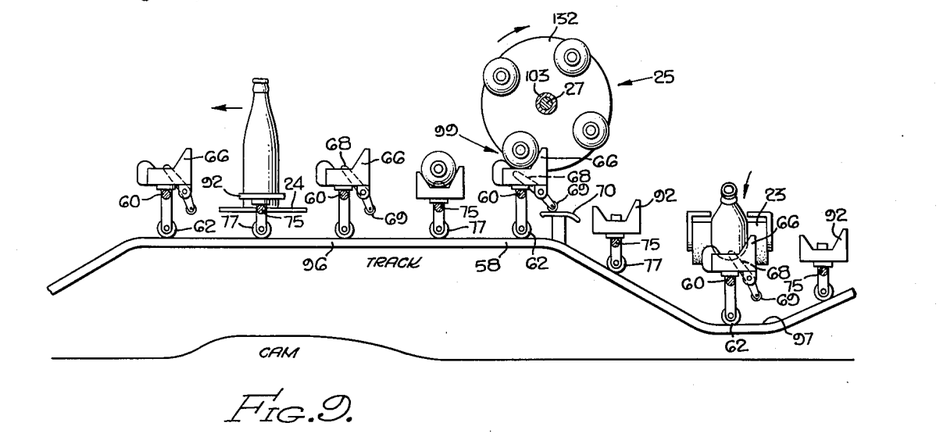
Fig. 9 is a diagrammatic view showing a cycle of the receiving and discharging arm cycle.

The cycle of operation of the arms 60 and 75 is shown diagrammatically in Fig. 9. The track 58 has a raised portion 96 beginning just beyond the loading conveyor 23 in the direction of rotation of the arms, and a lowered portion 97 beginning just beyond the unloading conveyor 24. At the loading conveyor 23 the track is at its lowest, and the loading arms 60 are there inclined downwardly to receive a bottle from the pick-up station, as also shown in Fig. 2. The finger 68 is there free to incline upwardly to act as a stop for the base of the inclined bottle. As the loading arms 60 approach the loading station of the turret assembly 25, they are raised by the track 58 so that the bottles carried by them are horizontal, and the roller 69 engages the track 70 to move the finger 68 away from the bottle base. When the loading arms 60 have delivered their bottles to the turret assembly 25, their function is completed until they return to the loading conveyor 23. The unloading arms 75 begin to function at the unloading station of the turret assembly 25, at which time the upper arms have been raised to the horizontal by the track 58, and the forearms 90 are parallel to the upper arms. As the arms 75 approach the unloading conveyor, the forearms 90 and the bottles held thereby are raised to the vertical, to unload the bottles upon the conveyor. The unloading function being completed, the inclination of the arms 75 is immaterial until they again reach the unloading station of the turret assembly 25.

Figures 4, 8:
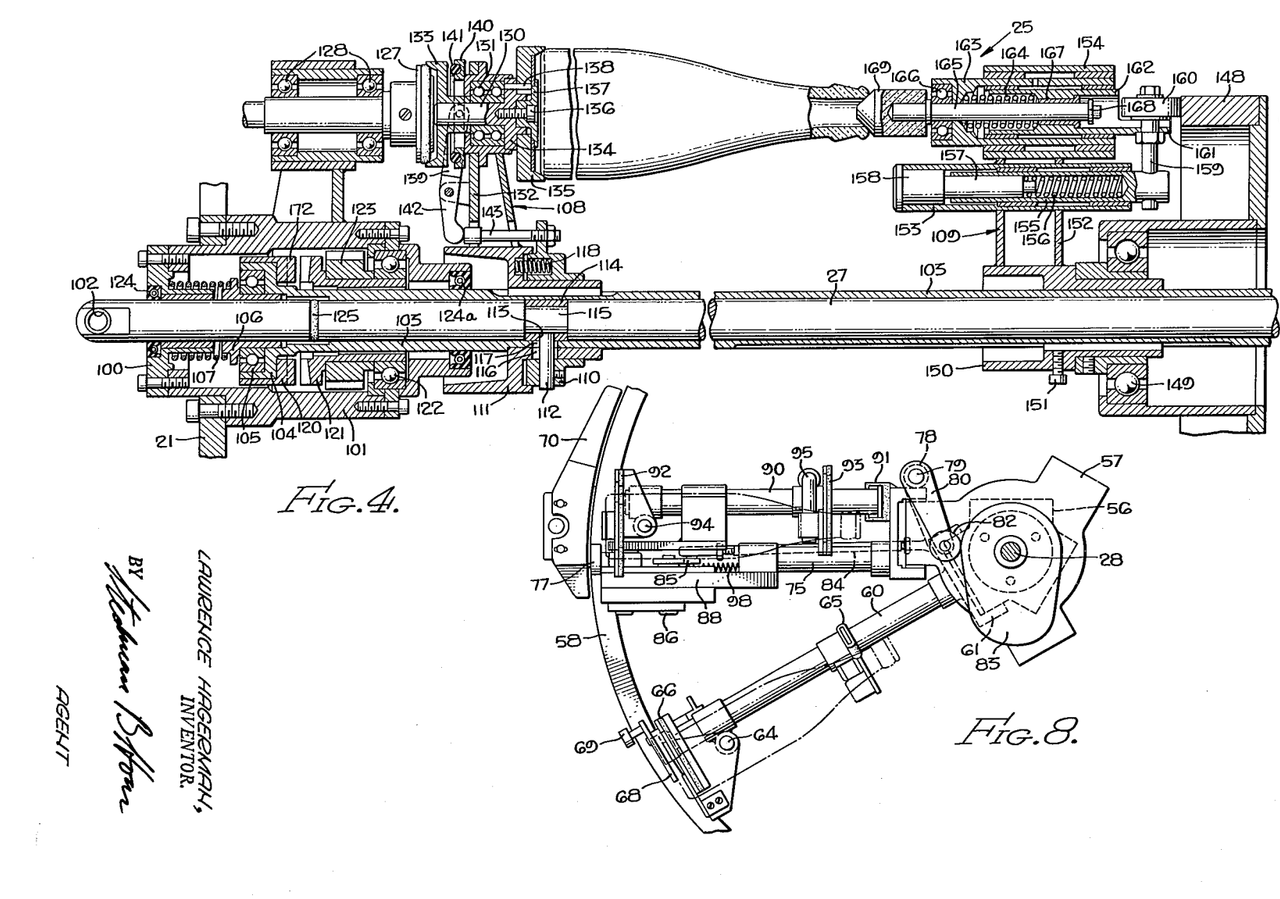
Fig. 4 is a vertical longitudinal section view, on a further enlarged scale, on the line of section 4—4 of Fig. 2, showing details of the chuck mechanism of a turret station and also details of the turret clutch.
Fig. 8 is a horizontal sectional view on the line of section 8—8 of Fig. 3, showing a pair of receiving and discharging arms, both of which for purposes of illustration are shown as holding bottles, although the receiving arm in the position illustrated would normally be empty.

It may here be noted that, as shown in Fig. 8 a bottle held in the saddle support 65 and 66 of a loading arm 60 is not radial to the loading assembly 22 but is parallel to the radial loading arm 60 and slightly in advance of the arm in the direction of the arm's rotation. In like manner, but oppositely, a bottle held in the saddle supports of a forearm 90 is not radial to the loading assembly 22, but is parallel to the radial unloading arm 75 and slightly behind the arm relatively to the direction of the arm's rotation. As previously pointed out the shaft 27 of the turret assembly is slightly at one side of the shaft 28 of the loading assembly; and this distance, towards the loading conveyor 23 is the same as the offset distances between the radial arms 60 and 75 and bottles held by these arms. As the offset between the shafts 27 and 28 and the offset between an arm 75 and the centers of the saddles 92 and 93 pertaining to the arm are in the same direction, the center line of the saddles will be parallel to the shaft 27 and therefore the saddles will be in position to receive a bottle, when the center line of the saddles is vertically below the shaft 27. The station directly below the shaft 27 is therefore the unloading station of the turret assembly 25. On the other hand, as the offsets between the shafts 27 and 28 and the offset between an arm 60 and the centers of the saddles 65 and 66 pertaining to the arm are in opposite directions, a bottle held in the saddles 65 and 66 will be parallel to the shaft 27 and therefore in position to be transferred to the turret assembly 25, when the bottle is at a distance beyond the vertical through the shaft 27 equal to the sum of the two offsets. This position in the cycles of the assemblies 22 and 25, designated 99 in Fig. 9, is the loading position of the turret assembly 25. The reason for this displacement of the loading position 99 will become understood hereinafter when the manner and timing of bottle transfer between the two assemblies is disclosed.

In the turret assembly 25, the central shaft 27 is supported adjacent to the printer 20 in a collar 100 secured to a clutch housing 101 which in turn is rigidly held by the frame 21. The end of the shaft 27 extending through the collar 100 is fitted as at 102 to receive the crank 47 by which it may be moved lengthwise in the collar 100 but is held against rotation. The other end of the shaft 27 is supported by the frame members 26. A sleeve 103 is mounted rotatably upon the shaft 27 and has a cup-shaped end 104 which extends within the clutch housing 101 where it holds an anti-friction bearing 105 which is pressed on a collar 106 slidable on the shaft 27. A spring 107, pushing against the fixed resistance of the collar 100 and against the sliding collar 106, tends to push the sleeve 103 to the right, as seen in Fig. 4. Lengthwise movement of the sleeve 103 relatively to the shaft 27 is, however, limited. Two chuck spiders, termed the base spider 108 and the neck spider 109, because they respectively chuck the bases and the necks of bottles, are secured to the sleeve 103, the base spider 108 being pressed and keyed to the sleeve in permanent position and the neck spider 109 being keyed to the sleeve to prevent relative rotation but being adjustably spaced from the base spider to accommodate bottles of various lengths. A brake release collar 110, so termed because as hereinafter shown it releases brakes on the chucks of the spider 108, is mounted slidably on the hub 111 of the spider 108 and has secured in it a pin 112 which engages a hole 113 in a split collar 114 set in an annular groove 115 in the shaft 27. The pin 112 enters the hole 113 through a slot 116 in the hub 111 and a registering slot 117 in the sleeve 103. It will be apparent that the shaft 27 and brake release collar 110 will move as a unit by reason of firm engagement with the ends of the pin 112, and that this unit has limited movement relatively to the firmly engaged sleeve 103 and base spider hub 111, as permitted by the length of the slots 116 and 117. Springs 118 urge the brake release coller 110 away from the hub 111 so that the pin 112 seeks the righthand ends of the slots 116 and 117, as viewed in Fig. 4. If the shaft 27 is pulled toward the left, as actuated by the crank 47, the pin 112 will urge the brake release collar 110 toward the left, against the compression of the springs 118, and thus will tend to move the base spider hub 111 and the sleeve 103 to the left against the compression of the spring 107. The springs 118 have greater collective strength than the spring 107, so that the first effect of pulling the shaft 27 (by the crank 47) is to cause the brake release collar 110 and the sleeve 103 to move as a unit until, as hereinafter shown, the sleeve is positively stopped, the brake release collar then being moved slightly further against the springs 118. When the shaft 27 is released the first resultant movement is that of the brake release collar, which must move with the shaft, followed when compression of the springs 118 is eased by movement of the sleeve in response to the spring 107.

Within the clutch housing 101 are cooperating clutch members 120 and 121, of which the member 120 is secured and keyed to the sleeve 103 adjacent the cupped end 104 thereof, so as to rotate and to reciprocate with the sleeve. The member 121 is free to rotate about the sleeve 103, and with respect to the clutch housing 101, being held in the clutch housing by anti-friction bearings 122. A pinion 123 is firmly mounted on the clutch member 121 and meshes with the quadrant rack 41. It will be apparent that when the crank 47 pulls on the shaft 27 sufficiently to cause the sleeve 103 to move with the shaft against the compression of the spring 107, the clutch member 120 will separate from the clutch member 121, and that when the crank 47 permits the shaft 27 again to move in response to the spring 107, the clutch members will re-engage. The cams 40 and 45 are so timed that movement of the quadrant rack 41 in the direction of the arrow in Fig. 10 occurs just as the clutch is engaged, causing the sleeve 103 and the spiders 108 and 109 secured thereto to rotate 90 degrees. The clutch is disengaged just before the quadrant rack 41 moves in the opposite direction, permitting the clutch member 121 to be moved back to its original position, without however causing reverse rotation of the sleeve and spiders. Thus intermittent rotary motion is imparted to the spiders 108 and 109, the movement occurring when the shaft 27 is released by the crank 47, and the rest period occurring when the shaft is pulled. Oil-sealing rings 124 and 124a may be provided on the collar 100 and clutch housing 101 so that the elements within the housing may operate in a lubricant, and an oil seal 125 may be provided on the shaft 27 to retain lubricant at the inner surface of the sleeve 103.

The clutch housing 101 supports two clutch members 126 and 127 disposed 90 degrees apart so as to be engageable with chucks of the base chuck spider 108 when the spider comes to rest. One of these clutch members 127 is at the printing station vertically above the unloading station 99, and the clutch member 126 is at the registering station half way between the unloading station 99 and the member 127 on the ascending side of the turret. These clutch members are disks or wheels faced with friction material and are mounted for rotation in anti-friction bearings 128 (see Fig. 4). The clutch member 126 is driven by the belt 54, which as hereinbefore stated is adjusted to permit slippage when the clutch member 126 is prevented from rotating. The clutch member 127 is driven by the belt 50 which is given several turns around a pulley 129 and which turns the pulley first one way and then the other as the color frame 31 reciprocates.

The base spider 108, in the preferred form herein illustrated has four identical legs, one of which is shown in detail in Fig. 4. Each leg comprises a spindle 130 mounted in anti-friction bearings 131 and carried on a bracket 132 extending radially from the spider hub 111. A clutch member 133 is secured to each of the spindles 130 and adapted to engage with either of the clutch members 126 or 127 for rotating the spindle. At the other end of each spindle is a plate 134 on which a disk-shaped chuck 135 is mounted. The chucks 135 are secured to the plates 134 by bolts 136 and retaining rings 137 so as to be replaceable in various sizes to accommodate bottles of various diameters, and are held against accidental rotation, should the bolts 136 become loosened, by pins 138. A yoke 139, pivotally supported on each of the brackets 132, holds swingingly a brake drum 140 on which a friction ring 141 is held adjacent to the back of the clutch member 133. A lever 142 on the yoke 139 extends inwardly to a position in which it may be engaged by an adjustable bolt 143 mounted in the brake release collar 110. Springs 144, shown in Fig. 6, urge the yoke 139 to swing the brake ring 141 into engagement with the clutch member 133. It will be seen that when the brake release collar 110 is pulled to the left, as viewed in Fig. 4, the bolts 143 will cause the yokes 139 to swing the brake rings 141 away from the clutch members 133, and that upon release of the collar 110, the springs 118 will move the collar so as to permit the brake rings 141 to re-engage the clutch members 133 as urged by the springs 144.

As previously noted, the first effect of pulling the shaft 27 is to move the brake release collar 110 and the sleeve 103 as a unit. This first stage of movement causes the main clutch members 120, 121 to disengage to stop rotation of the turret assembly 25 as a whole, and simultaneously permits the clutch members 133 to engage with the clutch members 126 and 127 to start rotation of the spindles 130 then at the registering and printing stations. When the clutch members 133 meet the clutch members 126 and 127, the sleeve 103 can move no further, and further movement of the shaft 27 pulls the brake release collar 110 with it against resistance of the springs 118. The bolts 143 are adjusted to become effective upon the yokes 139 at this stage of movement, thus releasing the brake rings 141 only when movement of the turret assembly as a whole has ceased. Conversely, when the shaft 27 is released, the brake release collar must move in unison with it, and the first stage of movement of the shaft causes the bolts 143 to retract from the yokes 139, to permit the springs 144 to set the brakes 141. Further released movement of the shaft 27 after the compression of the springs 118 has been eased permits the sleeve 103 to follow the shaft and causes the clutch members 133 to disengage from the members 126 and 127, and the clutch members 120 and 121 to engage. But again it is important to note that the brakes 141 are set before rotation of the whole turret assembly is permitted.

Extending from the frame 21 adjacent the printer 20 and parallel to the shaft 27 is a brace bar 145, held at its distal end by the frame members 26 which support also the end of the shaft 27. The bar 145 carries slidably a collar 146 which, by an arm 147 braces and holds against rotation a cam-track 148. The cam-track 148 is mounted on anti-friction bearings 149 on the hub 150 of the neck spider 109, this hub being keyed to the sleeve 103 and held adjustably lengthwise thereon by a set-screw 151. Although the cam-track 148 may not rotate with the sleeve 103 and hub 150, it may and does reciprocate therewith by reason of its mounting on the hub 150 and slippage of the collar 146 on the bar 145.

The hub 150 carries spider legs corresponding in number and orientation with the legs of the base spider 108. Each leg comprises a bracket 152 which carries a cylinder 153 and a sleeve 154. The cylinder 153 carries a hollow piston 155 actuated by a spring 156 reacting against a guide pin 157 in the cylinder head 158. The outer end of the piston 155 holds radially an axle pin 159 on which is a roller 160 adapted to roll on the track 148. The axle pin 159 is also supported by an extension 161 of a hollow plunger 162. The plunger 162 is mounted for reciprocation within a cylinder 163 which is held slidably in the sleeve 154, and is actuated in this relative movement by the cam track 148, roller 160, and spring 156. The cylinder 163 also has reciprocal movement with respect to both the sleeve 154 and the plunger 162, being actuated with respect to the latter by a spring 164. A spindle 165 is held in anti-friction bearings 166 in the cylinder 163 and slides through a spool-bushing 167 secured in the plunger 162. A shoulder 168 on the spindle 165 engages the bushing 167 to prevent expulsion of the spindle and the cylinder 163. A chuck member 169, which may be a rubber plug adapted to engage the mouth of a bottle, is mounted on the outer end of the spindle 165.

It will be seen that the spider 109 and cam track 148 will reciprocate in unison with the spider 108 as the sleeve 103 is moved lengthwise and that the two spiders will rotate in unison as the sleeve is rotated, the cam track then remaining stationary. Rotation of the spider 109 causes reciprocation of the spindles 165, by action of the rollers 160 on the track 148, so that the plugs 169 may be advanced to enter the neck of a bottle and press the bottle against an aligned cooperating chuck 135, and may be retracted to release the neck of a bottle. Minor variations in the lengths of bottles during an operational run are accommodated by yielding of the spring 164.

It is obviously important that the assembly comprising the spiders 108 and 109 should neither over-run a ninety-degree rotation, nor back lash after the rotation has been completed. The manner in which these possibilities are obviated is illustrated in Fig. 10. At the end of each 90 degree rotation, one of the cooperating pairs of chucks 135, 169 reaches the turret discharge station vertically below the shaft 27 and at that instant the roller 160 actuating reciprocation of the respective chuck 169 passes over the abrupt shoulder 170 of the track 148. The shoulder 170 effectually prevents any reverse rotation of the sleeve 103 and the various elements secured thereto. A stop 171, adjustable in coordination with the linkage 42, 43, arrests the quadrant 41 in the direction of movement which rotates the pinion 123 and the sleeve 103, preventing over-running. When the quadrant 41 moves in the opposite direction, the clutch members 120 and 121 are for the instant disengaged, so that the clutch member 120 and the sleeve 103 and spiders 108 and 109 are stationary and held so by the roller 160 and track shoulder 170. As the quadrant 41 completes the return movement, the clutch members 120 and 121 re-engage, the tooth 172 on the member 120 slipping into a notch in the member 121. To alleviate the abruptness with which the stop 171 might arrest the quadrant 41, a cup 173 is welded to the quadrant in position to receive the end of the stop 171. As the entire housing 101 may be filled with oil, the cup 173 will fill on each return stroke of the quadrant 41 and the oil will be forced out past the stop 171 on the downward stroke to provide a hydraulic check.

A bottle held in the above-described turret assembly may be brought to register—so as to receive an imprint on a predetermined sector of its periphery—by various means, the means herein selected for illustration being mechanical. The registering station of the turret assembly is, as before stated, at the clutch member 126, driven by the belt 54, and a bottle arriving there is rotated about its own axis by engagement of the clutch members 126 and 133 as soon as the turret ceases to rotate. A finger 175 is pivotally mounted on a plate 176, with a spring 177 holding the hub 178 of the finger against an adjustable stop 179, so that the finger may move upward from the position shown in Figs. 2 and 5 but may not swing downward. The distal end 180 of the finger 175 projects to the circle of rotation of a bottle held at the registering station, so that it may arrest rotation of the bottle by contact with an indexing nub 181 or other surface irregularity on the bottle. The bottle need be rotated only 360 degrees during the pause of the bottle at the registering station, and this may easily be accomplished by a slightly loose belt 54 which will slip when the finger 175 engages the nub 181, as the pause must be sufficient for a preceding bottle to receive an imprint or decoration at the following printing station.

The finger 175 is so placed that a radius of the turret assembly 25 passing diametrically through a bottle held at the registering station will be just beyond the end 180 of the finger 175 in the direction of intermittent movement of the turret. If it should happen that the nub 181 came on the same radial and diametrical line and on the side of the bottle adjacent the finger 175, the nub would lift the finger end 180, as permitted by the spring 177 and would then turn a full 360 degrees to re-engage the upper side of the finger end, the direction of rotation of the bottle by the belt 54 being such that rotationally the nub approaches the finger end from the direction toward which it will be moved by the next intermittent movement of the turret. This placement of the finger 175, coupled with rotation of the bottle and rotation of the turret as described, obviates the need of a retractive mounting for the finger in order to permit the nub to get past the finger on the next forward movement of the turret. The nub being already past the finger end when registration is completed, the bottle may proceed toward the printing station without interference, and firmly held in register by the brake 141 on the particular spider leg, this brake being set before the forward movement begins.

The slight reciprocating motion of the turret assembly 25 advantageously combines with the above-described registering device to prevent breakage of bottles. If a nub on a bottle is struck a sharp blow in a direction tangential to the bottle, the bottle may easily be cracked, while if the blow be directed on lines elemental to the cylindrical bottle surface, there is much less risk of breakage. During movement of the bottle from the loading point of the turret assembly to the registering station, the turret is advanced away from the registering and printing mechanism, the shaft 27 being then released to permit engagement of the main clutch 120, 121. It will be appreciated that rotary movement of the turret is rapid, to save time, and is rapidly stopped as hereinbefore described. But the nub 181 will not be on a diameter of the bottle aligned with the finger end 180 even if it happens to be precisely at the level of the finger end but will be disposed in a diametrical plane slightly at one side of the finger. It can not, therefore, be struck a tangential blow as the turret abruptly ceases to rotate, but at most will be brought into contact with the finger end 180 by a lengthwise movement of the bottle, when the turret is moved lengthwise as the shaft 27 is pulled by the crank 47. This is particularly important in view of the fact that the brake 141 will not be released until after the turret ceases to rotate.

The printing apparatus 20 is to a large extent conventional and forms no part of this invention but will be described briefly to make clear its cooperation with the novel elements of the machine and more particularly with respect to means for printing on a conical surface. From the cam 32 on the main drive shaft 30, a system of linkage generally indicated at 185 in Fig. 3 causes a squeegee control bar 186 to oscillate vertically upon a pivot 187. At the same time, other cam-actuated linkage and crank (not shown) causes a carriage 188 to reciprocate horizontally across the machine on rollers 189. The belt 50 which drives the clutch member 127 at the printing station is attached at its ends to the carriage 188 and thus is given reciprocating movement to turn the clutch member 127 first one way and then the other. A pair of bars 190 extends from the carriage 188 to a position above the turret assembly 25 and carries a pair of adjustable brackets 191 to which the color frame 31 is attached. Those familiar with the art will understand that the color frame is usually disposed above the cylindrical body portion of bottles or other ware to be decorated, so that the stencilling screen which the color frame contains may come in contact with that part of the bottle by suitable relative movement. For printing on the conical shoulder of a bottle 1 attach the color frame 31 pivotally to the brackets 191 by pivots 192 so that it extends forward over the shoulder to be printed and is urged upwardly away from the shoulder by a spring 193. A stop 194 strikes upon the bar 190 to limit the upward movement of the frame. A squeegee 195 is attached pivotally to the squeegee control bar 186 and is raised and lowered by the vertical oscillation of the control bar. The squeegee 195 is of course within the color frame 31, to force stencilling material through the stencilling screen 196. When the control bar 186 dips— a movement synchronized with the arrival of a bottle at the printing station and with the beginning of an endwise movement of the carriage 188 and color frame 31—the squeegee 195 presses the color frame down so that the screen 196 is swung against the shoulder of the bottle. The screen is then moved across the bottle while the bottle rotates. At the end of one printing step, i. e., movement of the color frame 31 in one direction, the control bar 186 lifts, and lifts the squeegee 195 from the screen 196, permitting the color frame to swing upwardly away from the bottle. Thus the insignia just printed is not smudged when rotation of the turret moves the bottle from the printing station.

The lifting of the color frame 31 for more than a bare clearance from the bottle is important because of the endwise reciprocation of the turret holding the bottle. Prior to the printing step, the turret has been pulled toward the printer 20 and at the end of the printing step, as a preliminary to further rotation, the turret is released for movement toward the color frame 31. It is necessary for the color frame 31 not only to lift from the bottle but to vacate the position into which the bottle is moved. Conversely, the color frame follows the bottle as the turret is pulled toward the printer 20, and may be so timed that the screen 196 overtakes the bottle shoulder just as the bottle ceases to move endwise, effecting a very gentle contact. This not only preserves the delicate screen 196 but prevents a smudging excess of color being pressed from the screen at the point of initial contact.

It is to be understood that my invention is not limited to use with the above-described printing apparatus but may be coordinated with other suitable printers.

A very simple mechanism may be provided for inactivating the printing mechanism when no bottle is at the printing station, this mechanism taking advantage of the fact that a bottle is lifted by the turret into printing position. An arm 200 is secured to a shaft 201 supported by the brace-bar 145. A second arm 202, also secured to or integral with the shaft 201, is connected by a link 203 with one end of a crank 204 pivoted at 205. The other end of the crank 204 is a post 206 which extends upwardly through the frame of the printer 20 in position to be swung into or out of engagement with a block 207 on the lower side of the squeegee control bar 186. A spring 208 biases the crank 204 to the position in which the post 206 is beneath the block 207. When a bottle is raised by the turret assembly 25 to the printing station, the neck of the bottle makes contact with the arm 200, and through the described intermediate mechanism causes the post 206 to move from under the block 207, so that the squeegee bar 186 may descend and cause the squeegee 195 to function as described. When the bottle is moved along by rotation of the turret, and the bar 186 lifts again, the post 206 swings again under the block 207, to prevent descent of the bar 186 until again moved by another bottle.

Figures 6, 7:
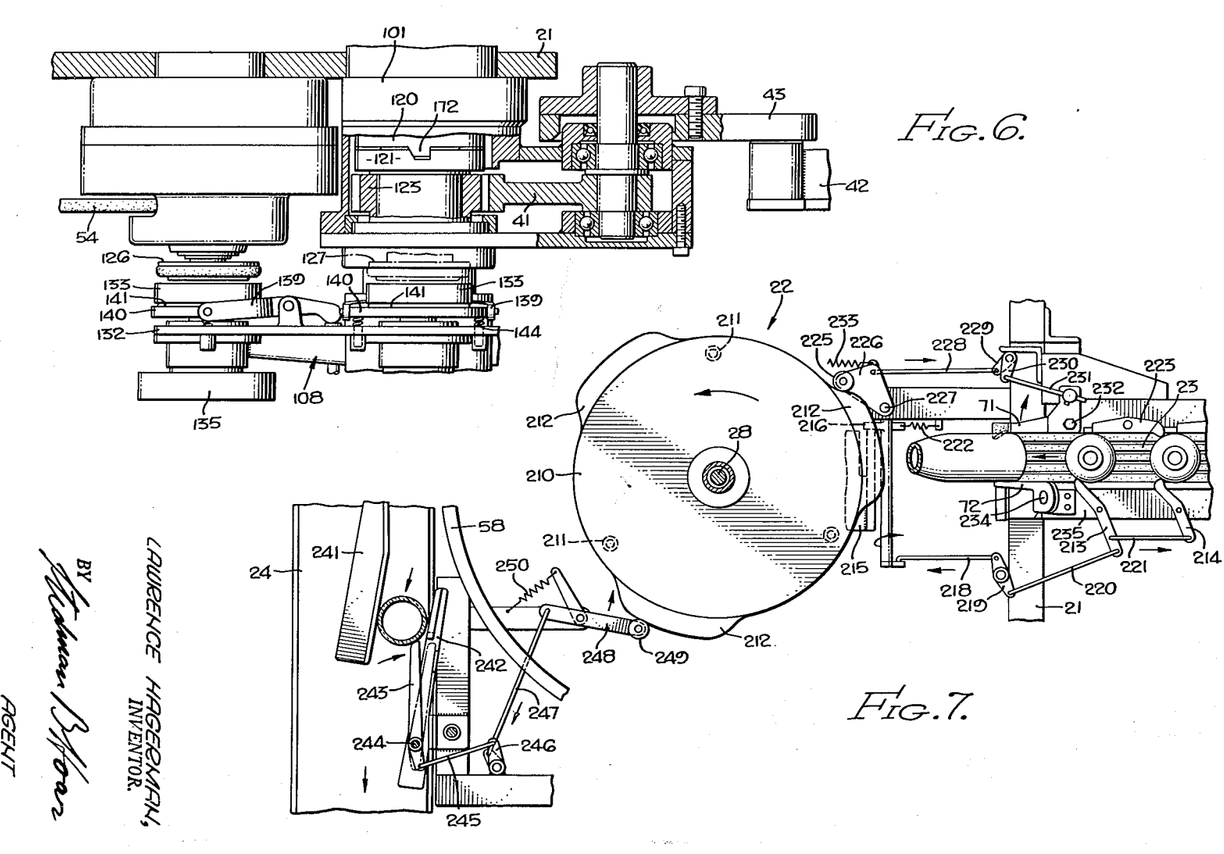
Fig. 6 is a horizontal sectional view on the line of section 6—6 of Fig. 5, and enlarged in scale, showing details of the clutch system on individual turret stations.
Fig. 7 is a horizontal sectional view on the line of section 7—7 of Fig. 2 and slightly reduced in scale, illustrating the cam system by which the receiving and discharging arms of the rotary loading assembly are operated.

Timing and control of the transfer of a bottle from the loading conveyor 23 to the loading arms 60 and from the unloading arms 75 to the unloading conveyor 24 is effected by mechanism illustrated in part in Fig. 2 and in greater detail in Fig. 7. A plate 210 is secured to the hub 39 of the loading assembly 22 so as to rotate therewith and carries rollers 211 placed each a little in advance of one of the loading arms 60. A cam, also secured to rotate with the hub 39, has shoulders 212 projecting beyond the plate 210. The rollers 211 operate spacing fingers 213 and 214 on the loading conveyor 23 to allow bottles to arrive at the end of the conveyor at intervals coinciding with the arrival of loading arms 60 to receive the bottles. The rollers act upon a bar 215 carried by one arm of a crank 216 which is pivoted at 217. The other arm of the crank 216 is connected by a link 218 to a walking beam 219 and thence by links 220 and 221 to the fingers 213 and 214. When the bar 215 is pressed by one of the rollers 211, the crank 216 and link 218 pull on the walking beam 219 and cause the links 220 and 221 to push on the pivoted fingers 213 and 214 to move the ends of the fingers from the path of bottles on the conveyor 23. A spring 222 returns the crank 216 and the mechanism responsive thereto to the original position after the roller 211 has passed the bar 215. A swing gate 223 is mounted on the side of the conveyor opposite the fingers, the passage of a bottle past one end of the gate swinging the other end of the gate into the path of a succeeding bottle. The gate 223 and the finger 214 thus hold back each bottle until action of a roller 211 on the bar 215 withdraws the finger 214. By the time the bottle reaches the finger 213, that finger has been reinserted in the bottle's path, thrusting the bottle against the gate 223 to stop the next succeeding bottle.

The cam shoulders 212 act upon a roller 225 on an arm 226 pivoted at 227. The arm 226 is connected by links 228, 229 and 230 to an arm 231 pivoted at 232. The finger 71, forming part of the pick-up station, is on the end of the arm 231 and is swung out of the path of a bottle by action of a cam shoulder 212 and the roller 225 as the bottle is picked up by a loading arm 60. The cam shoulder 212 is timed to swing the finger 71 from the new path of the bottle as soon as the bottle is nested in the saddles 65 and 66. A spring 233 returns the finger 71 to a bottle-supporting position when the cam shoulder 212 has passed the roller 225. The cooperating finger 72 may be pivoted at 234 so as to yield in the direction in which the arms 60 and 75 rotate. It will normally return by gravity or by pressure of a following bottle to a position limited by contact with a rail 235. In this position it forms with the finger 71 a supporting cradle for a bottle.

The cam shoulders 212 also act upon a bottle spacing mechanism on the unloading conveyor 24. When the forearm 90 of the unloading arm 75 is swung to a vertical position, it will deposit a bottle upon the unloading conveyor 24, and the bottle is then guided by guides 240, 241 and 242. As it may be desirable to inspect the bottles at this point and as the stencilling material will be wet and subject to blurring, it is convenient to have the bottles accurately spaced, and not irregularly as might result from resistance of the guides. Stop-fingers 243 are pivoted at 244 to swing into the path of the on-coming bottles. Linkage 245, 246 and 247 connects the fingers 243 to a crank-arm 248 on which is a roller 249 in the path of the cam shoulders 212. Contact of the roller 249 with a cam shoulder 212 will momentarily swing the finger 243 into the path of a bottle. When the cam shoulder 212 passes the roller 249, a spring 250 swings the crank arm 248 so as to push on the linkage 247 and remove the finger 243 from the bottle path.

A full cycle of operation for one bottle is as follows: The bottle tips from the conveyor 23 onto the pick-up station formed by the fingers 71 and 72 and the pad 73 and is swept from there while in an inclined position by an arm 60 which is at the moment inclined parallel to the bottle. The bottle is carried on the saddles 65 and 66 to the loading station of the turret 25, which is just beyond the vertical axis of the turret, the arm 60 meanwhile rising to present the bottle parallel to the turret axis. The turret will have stopped momentarily with a pair of its cooperating chucks 135 and 169 at the unloading station directly below the turret axis to transfer a previous bottle to the unloading arm 75 of the preceding pair of arms. As the turret starts to rotate again, the chuck 135 is advanced slightly toward the bottle by the release of the shaft 27 and sleeve 103 and as the chucks and the bottle simultaneously reach the loading station, the chuck 169 is advanced into the bottle mouth by action of the roller 160 on the track 148, pressing the bottle against the chuck 135 and transferring the bottle from the loading assembly to the turret assembly.

The bottle is moved to the registering station, where the turret stops, the clutch 133 is engaged by the clutch member 126, and the brake 141 is released from the clutch 133. The bottle is then whirled until the nub 181 is stopped by the finger end 180. The brake 141 is then reset, the clutches 126, 133 disengaged and the turret rotates to bring the bottle to the printing station. At this point the arm 200 is raised by the bottle and the post 206 is removed from under the block 207 to permit the squeegee 195 to make contact with the stencil screen 196. Again the clutch 133 is engaged, this time by a clutch member 127, the brake 141 is released, and the bottle is turned in whichever direction the carriage 188 may be moving while it receives an imprint.

Once again the brake 141 is set, the clutches 127, 133 are disengaged, and the turret moves the bottle to the unloading station in two stages, an idle stop being made directly opposite the registering station. As the bottle reaches the unloading station, an unloading arm 75 arrives to receive it, with its forearm 90 folded back and parallel to the bottle. This arm 75 will be the unloading arm paired with the loading arm 60 which brought the particular bottle to the turret, but the chucks just discharging the bottle will receive their next bottle from the arm 60 of the following pair. As the turret stops at the unloading station, the roller 160 rolls over the sharp shoulder 170 of the track 148, pulling the chuck 169 from the mouth of the bottle. At the same instant the shaft 27 and sleeve 103 are pulled back, thus moving the chuck 135 from the base of the bottle, so that the bottle is not propelled in either end direction but is simply left unsupported by the chucks, to be swept sideways by and into the saddles 92 and 93.

The unloading arm 75 swings the bottle to the unloading conveyor 24. As the arm approaches the discharge point, the forearm 90 rises and deposits the bottle vertically upon the conveyor belt.

The entire action just described can take place in about five seconds, fifty to sixty bottles being imprinted every minute. Registering is achieved in the time interval required to print a bottle, as a step in a cycle, and once achieved need not be repeated. Printing is achieved on conical as well as on cylindrical surfaces. Because of such features as the inclined pick-up station and similarly inclined loading arm, the relatively displaced axes of the two rotating assemblies which permit the receiving assembly to be always moving at the instant of transfer, and the reciprocation of the turret as the bottle reaches the registering station and the unloading station, breakage of bottles is reduced below the usual minimum. As all functions of the turret assembly are instigated and/or controlled by its very slight reciprocation, there is no time wasted in development of movement.

While the foregoing specification describes the presently preferred embodiment of my invention, my invention is not to be considered limited to the form illustrated and described but may properly be held to include all changes and modifications coming within the scope and spirit of the appended claims.

I claim:

1. In a decorating machine inclusive of printing means: a rotary turret; means for moving said turret intermittently through a succession of positions; a plurality of article holders carried by said turret for transporting articles to said printing means; and two arms for transporting said articles to and from said article holders, said arms being arranged to rotate continuously and circularly about a single axis and to intercept the orbit of said article holders at two positions at one of which said turret stops and the other of which is between positions at which said turret stops and to receive an article from one of said article holders at said one position and then to deliver another article to said one article holder at the other of said positions.

2. In apparatus for conveying bottles and like articles to and from printing mechanism of a decorating machine: a hub; a plurality of arms carried by said hub for rotation thereabout; means on said arms for supporting articles to be printed; a turret interposed between the path of said arms and said printing means for carrying said articles from said arms to said printing means and then returning said articles to said arms; a plurality of paired chucks on said turret for gripping individually a plurality of said articles while said articles are transported by said turret; means for intermittently moving said turret rotatively so as to move said paired chucks to successive stations inclusive of a registering station, a printing station and an unloading station, and to stop said chucks at said stations, the orbit of alternate arms intersecting the orbit of said chucks at said unloading station and the orbit of the next following arms intersecting the orbit of said chucks at another position between said unloading station and said registering station; means for rotating said hub continuously so as to cause alternate arms to arrive at said unloading station coincident with the arrival thereat of a pair of chucks and the next following arms to arrive at said other position coincident with the arrival thereat of the same pair of chucks; means for actuating said pair of chucks on arrival at said unloading station to then discharge an article to the arm then passing the unloading station; said means being responsive to further movement of said turret to cause the same pair of chucks to grasp an article carried by the next following arm at said other position while both said turret and said following arm are in motion.

3. In apparatus for conveying bottles and like articles to and from printing mechanism of a decorating machine: a hub; means for rotating said hub; arms carried by said hub for rotation thereabout; carrier means interposed between the path of said arms and said printing mechanism for receiving an article from one of said arms; carrying said article to said printing means, and returning said article to another of said arms; said carrier means being mounted for rotation about an axis at a right angle to the axis of rotation of said hub; means on said arms for supporting articles in positions in which said articles become aligned, during rotation of said arms, with the positions in which they are received and discharged by said carrier means; the support means on said one arm being arranged to hold an article in an alignment differing in respect to the radii of said hub from the alignment in which an article is held by the support means of said other arm, whereby articles supported by said one arm and by said other arm become aligned with the positions in which they are received and discharged by said carrier means at different points on the rotational path of said carrier means.

4. In apparatus for conveying bottles and like articles to and from printing mechanism of a decorating machine; a hub; means for rotating said hub; arms carried by said hub for rotation thereabout; carrier means interposed between the path of said arms and said printing mechanism for receiving an article from one of said arms, carrying said article to said printing means, and returning said article to another of said arms; said carrier means being mounted for rotation about an axis at a right angle to the axis of rotation of said hub; means on said arms for supporting articles in positions in which said articles become aligned, during rotation of said arms, with the positions in which they are received and discharged by said carrier means; the axes of rotation of said arms and of said carrier means lying in different planes, and the support means of one of said arms being arranged to hold an article in an alignment parallel to a radius of said hub but offset therefrom to the same extent and in the same direction as the offset between said axes of rotation, whereby said article becomes parallel to the axis of said carrier means when in the plane containing said axis normal to a radial plane of said hub.

5. In a decorating machine: a conveyor for carrying in upright position articles to be decorated, said conveyor having a margin terminating the path of said articles thereon over which margin said articles may topple forwardly; spaced support members for receiving and supporting the upper and lower ends of an article toppled from said conveyor, that member which receives the upper end of said article being elevated above the member receiving the base of said article so as to shorten the angle of a fall of said article; means yieldably mounted above said elevated member for engaging the upper end of a toppling article to restrict forward motion of said article and arranged to return to a position above the upper end of said article to restrict reverse upward movement of said article; and means mounted for movement transversely of the position in which said article is held by said support members for carrying said article from said support members.

6. In a decorating machine: a conveyor for articles to be decorated; support means for receiving an article from said conveyor in one position with reference to the horizontal; a turret rotatively mounted and arranged to receive said article in another position with reference to the horizontal; and an intermediate rotative carrier mounted for movement transversely of said support means and transversely of the orbit of said turret and for subsequent change in inclination so as to pick up said article from said support means in said one position and to deliver said article to said turret in said other position.

7. In a decorating machine inclusive of printing means: a shaft, reciprocable lengthwise; a sleeve on said shaft, rotatable thereabout and reciprocable therewith and having limited reciprocating movement relatively to said shaft; a turret secured to said sleeve, inclusive of individually rotatable means for grasping articles to be decorated for transportation to said printing means; a first clutch member rotatable about said sleeve; a second clutch member secured to said sleeve and engageable with said first clutch member by lengthwise movement of said sleeve in one direction; means for rotatively oscillating said first clutch member; clutches on said grasping means; driving means with which said clutches are engageable by lengthwise movement of said turret and said sleeve in direction opposite to said one direction; brakes on said clutches engageable therewith by movement of said shaft in said one direction; and means for reciprocating said shaft in synchronization with said oscillating means, whereby said clutch members are engaged to rotate said turret in one direction of rotation only when said shaft and said sleeve are moved in said one lengthwise direction, and said clutches are then disengaged and said brakes set, and said clutch members are disengaged and said brakes released and said clutches engaged when said shaft and said sleeve are moved in the opposite direction.

8. In a decorating machine inclusive of printing means: the construction set forth in claim 7 and including yielding means for urging said shaft in said one direction relatively to said sleeve, whereby said shaft moves first in said one direction, when so permitted, to set said brakes, said shaft and said sleeve thereafter moving as a unit to release said clutches and to engage said clutch members.

9. In a decorating machine: a turret, inclusive of means for grasping individually a plurality of articles to be decorated, for moving said articles rotatively and intermittently to a station at which they may be printed; means for moving said turret reciprocatingly lengthwise; means for moving said turret rotatively; and means responsive to lengthwise reciprocation of said turret for intermittently engaging said turret with said rotatively moving means.

10. In a decorating machine: a turret, inclusive of rotatable means for grasping individually a plurality of articles to be decorated, for moving said articles successively to a work station; means for moving said turret reciprocatingly lengthwise; driving means; and means responsive to lengthwise reciprocation of said turret for engaging said rotatable means with said driving means.

11. In a decorating machine: a turret, inclusive of rotatable means for grasping individually a plurality of articles to be decorated, for moving said articles successively to a work station; means for moving said turret reciprocatingly lengthwise; means for driving said rotatable means; brakes applicable to said rotatable means; and means responsive to lengthwise reciprocation of said turret for applying said brakes to said rotatable means.

12. In a decorating machine for articles having surface irregularities utilizable as indexing points: a turret, rotatable to a work station, through a circular path and inclusive of means for holding said articles individually rotatable; a finger extending into said circular path so as to engage indexing points on said articles to stop individual rotation of said articles; and means for rotating said holding means in a direction to move said indexing points into engagement with said finger in a direction opposite to the course of said circular path, whereby said indexing point is free to follow said circular path, said finger being disposed rearwardly of said indexing point in said path.

13. In a decorating machine for articles having surface irregularities utilizable as indexing points: a turret for holding said articles individually rotatable, and intermittently rotatable as a whole to move said articles successively to a work station through a circular path; a finger extending into said circular path so as to engage indexing points on said articles to stop individual rotation of said articles; and means for reciprocatingly moving said turret lengthwise during intermittent rotation of said turret, so that said indexing points may approach the position of said finger along said circular path in a plane parallel to the plane of said finger and then be moved into the plane of said finger by lengthwise movement of said turret.

14. In a decorating machine: a turret rotatable for moving articles to be decorated successively to a work station; means for receiving said articles from said turret; cooperative chuck means on said turret for holding said articles parallel to the axis of rotation of said turret; means for retracting one of said chuck means to release an article held thereby to said receiving means; and means for moving said turret endwise in direction opposite to the retractive movement of said one chuck means simultaneously with said retractive movement.

15. In a decorating machine for bottles and like articles having conical surfaces: carrier means for transporting to a printing station an article to be decorated; means for moving said carrier means so as to move said article endwise at the instant of arrival of said printing station; a color frame pivotally mounted for arcuate movement in the direction of the endwise movement of said article to positions in contact and out of contact with the conical surface of said article; and means for moving said color frame arcuately towards the conical surface of said article at a greater speed and for a greater distance than the endwise movement of said article and simultaneously therewith and in the same direction, whereby said color frame gently overtakes said conical surface.

References Cited in the file of this patent

UNITED STATES PATENTS

| Number | Name | Date |
|---|---|---|
| 2,085,126 | Shurley et al. | June 29, 1937 |
| 2,183,223 | Mankin et al. | Dec. 12, 1939 |
| 2,231,535 | Jackson et al. | Feb. 11, 1941 |
| 2,237,058 | Nutt | Apr. 1, 1941 |
| 2,278,570 | Shurley | Apr. 7, 1942 |
| 2,307,404 | Heyne | Jan. 5, 1943 |
| 2,593,627 | Stover | Apr. 22, 1952 |